No. 660,930. Patented Oct. 30, 1900.
C. F. SCOTT.
METHOD OF VARYING ACTIVE LENGTHS OF ELECTRICAL CONDUCTORS.
(Application filed Aug. 21, 1897.)
(No Model.)
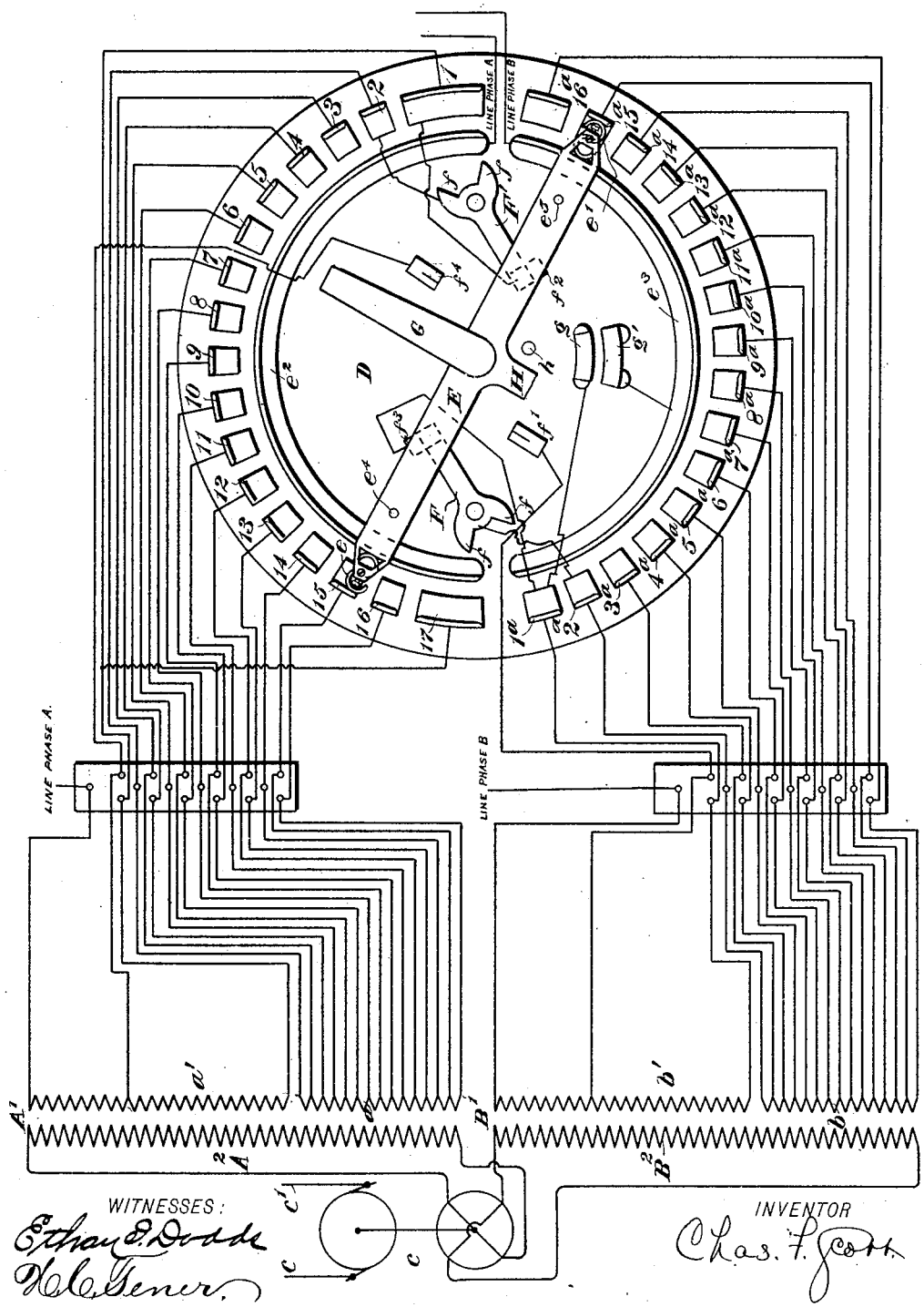
WITNESSES: 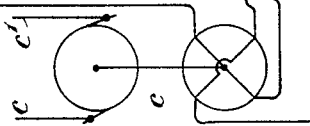 INVENTOR

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF PENNSYLVANIA.

METHOD OF VARYING ACTIVE LENGTHS OF ELECTRICAL CONDUCTORS.

SPECIFICATION forming part of Letters Patent No. 660,930, dated October 30, 1900.

Application filed August 21, 1897. Serial No. 649,031. (No model.)

*To all whom it may concern:*

Be it known that I, CHARLES F. SCOTT, a citizen of the United States, residing in Pittsburg, in the county of Allegheny and State of Pennsylvania, have invented a new and useful Improvement in Methods of Varying the Active Lengths of Electrical Conductors, (Case No. 752,) of which the following is a specification.

My invention relates to methods of electrical distribution; and it has for its object to provide a method of varying the electromotive forces supplied by stationary transformers effectively and advantageously and at the same time to secure a better result than has heretofore been attained.

Apparatus suitable for practicing my invention is illustrated in the accompanying drawing, in which $A'$ and $B'$ are transformers intended, respectively, for transforming currents which differ from each other in phase by a quarter-period. As shown, the secondary windings $A^2$ and $B^2$ of these transformers are connected to a rotary transformer C for supplying direct current to a circuit $c\,c'$; but the invention may be utilized in connection with alternating-current translating devices—such as motors, for example—if desired.

In order to vary the electromotive force at the direct-current terminals of the rotary transformer C or the electromotive force supplied to the translating devices, whatever they may be, connected in the secondary circuits of the transformers $A'$ and $B'$, I propose to vary the active length of either the primary or secondary winding of each transformer, the two being varied alternately step by step in order that the electromotive force delivered by the two secondaries may vary uniformly and in case a rotary transformer is supplied thereby that the direct current delivered may be substantially smooth and continuous. In the present instance I have illustrated means for varying the active lengths of the primary windings of the two transformers; but the invention is not intended to be limited to the primary as distinguished from the secondary, the result being the same in both cases.

In order to vary the electromotive forces in the manner above described, I employ a suitable switch D, having two sets of stationary contacts 1 to 17 and $1^a$ to $16^a$, each set being arranged substantially in a semicircle. The contacts 1 to 17 are connected to a series of leads from a portion $a$ of the primary winding of the transformer $A'$ and the contacts $1^a$ to $16^a$ are connected to corresponding leads from a portion $b$ of the primary winding of the transformer $B'$. The number of subdivisions of each of these portions $a$ and $b$ which is included in the main circuit is determined by the position of a pivoted arm E, having contacts $e$ and $e'$ at its respective ends, which close the circuit between the stationary contacts and corresponding concentrically-located semi-annular strips $e^2$ and $e^3$. The pivoted arm E is provided near its respective ends with pins $e^4$ and $e^5$, each of which is so located as to engage with one of the projections $f$ on a pair of auxiliary switch-arms F and F', so as to throw said arms simultaneously from the respective coöperative stationary contacts $f'$ and $f^2$ to the contacts $f^3$ and $f^4$, or vice versa, according to the direction of movement of the arm E.

$g$ and $g'$ are two stationary contact-pieces respectively connected electrically with the contact-pieces $e^3$ and $1^a$ and located in the path of movement of a contact-arm G, which is mechanically connected to and movable with the arm E. The arm E is provided with a projection H, from which depends a stop-piece (not shown) which engages with a stop-pin $h$ when the arm E has made a complete rotation.

Assuming that the auxiliary switch-arms F and F' are in the positions indicated in the drawing and that the switch-arm E is to be moved in the direction of the hands of a clock, the operation is as follows: In the position shown the first subdivision of each of the sections $a$ and $b$ of the primary windings is cut out, as will be readily seen by tracing the circuits from the conductors designated as line-phase A and line-phase B through the half-rings $e^2$ and $e^3$, movable contacts $e$ and $e'$, and stationary contacts 15 and $15^a$ and the corresponding circuit-wires. If the arm E be moved another step, it will first cut out another subdivision of the primary of the transformer B', and then another subdivision of the primary of the transformer A', and so on until very nearly a half-revolution of the arm E has been effected, when the pins $e^4$ and $e^5$ will respectively come into contact with the outermost projections $f$ on the auxiliary switch-arms F' and F and throw them out of engagement with the corresponding contacts $f^2$ and $f^3$. A continuation of this movement of the arm E will cause the pins $e^4$ and $e^5$ to move the arms F' and F into contact with the stationary contact-pieces $f^4$ and $f'$. This, as will be seen, will so change the circuits that when the contacts $e$ and $e'$ engage with the pieces $16^a$ and 16 the subdivided portions $a$ and $b$ of the transformer primary winding will be again in circuit and the divisions $a'$ and $b'$ will be cut out of circuit.

It will be observed that the arrangement of the sets of stationary contacts with reference to each other and with reference to the contacts $e$ and $e'$ is such that both circuits are never broken at the same time. When the contact $e$ is passing from contact 1 to contact $16^a$, the arm G bridges the strip $g$ and $g'$, thus closing the circuit for phase B through the strip $e^3$ and contact $1^a$. At that time contact $e'$ is on contact 17 and the circuit for phase A is through that contact and strip $e^2$.

It follows from the operation described that the rotary transformer is at all times supplied with either one or two phases of current and that it therefore delivers an approximately continuous current.

If the rotation of the arm E is continued in the same direction until the stationary contacts are all passed a second time, the divisions $a\ a'$ and $b\ b'$ of the transformer primary windings will be entirely cut out. Further movement of the arm E is prevented by the engagement of the stop-piece on the projection H with the pin $h$. A reverse movement of the arm E will serve to reinsert the subdivided portions of the winding step by step until a half-rotation is effected, when the auxiliary switches will be thrown in the other direction to cut out these subdivided portions and at the same time cut in the next portions. Another half-rotation of the arm will serve to again cut in the subdivided portions of the transformer-windings step by step until the entire primary windings are in circuit. This replacing of a subdivided portion by a corresponding length which is not subdivided is extremely advantageous by reason of the fact that a much smaller and less complicated switching apparatus may be employed, since the number of stationary contact-pieces is only one-half what it would be if the entire portion of the transformer-winding cut out should be cut out step by step.

I desire it to be understood that my invention is in no wise limited to the particular apparatus illustrated and described, since any apparatus which may be devised or employed for practicing the method may be used without departing from the spirit and scope of the invention. I desire it to be also understood that my invention is not limited to any specific number or kind of circuits, either as regards phases of current or kinds of apparatus producing or utilizing the same.

I claim as my invention—

1. The method of varying the electromotive force supplied by a transformer which consists in gradually cutting in or out a subdivided portion of either the primary or the secondary winding of the transformer, and when such portion is all inserted or cut out, simultaneously cutting out or reinserting said portion and inserting or cutting out another portion of substantially the same length.

2. The method of varying the electromotive force supplied by a transformer which consists in gradually cutting in or out a subdivided portion of the primary or the secondary winding of the transformer and when such portion is all inserted or cut out, simultaneously cutting out or reinserting said portion and inserting or cutting out another portion of the same length, and finally gradually inserting or cutting out said subdivided portion.

In testimony whereof I have hereunto subscribed my name this 18th day of August, A. D. 1897.

CHAS. F. SCOTT.

Witnesses:
WESLEY G. CARR,
H. C. TENER.